Figure 1:
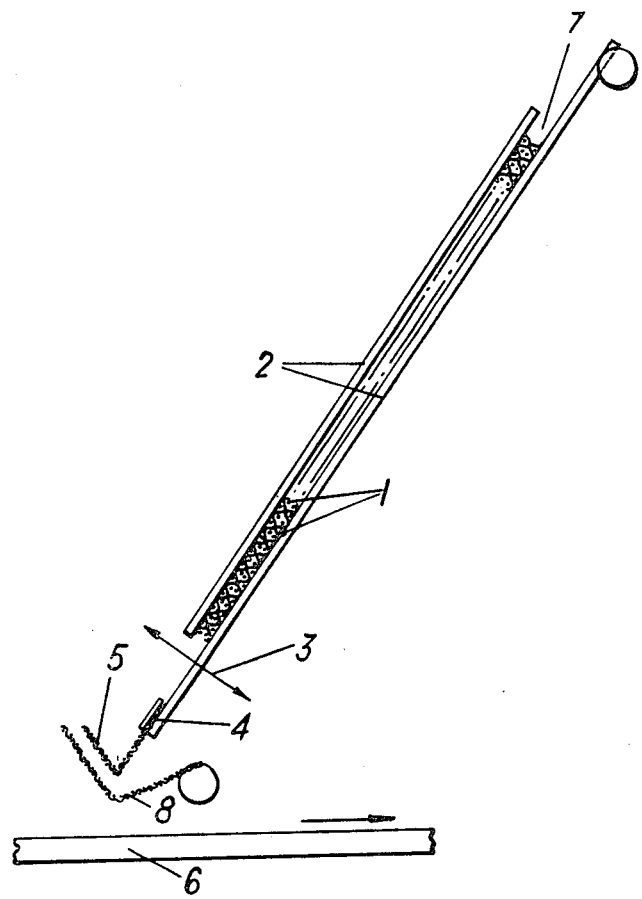

United States Patent [11] 3,632,372

| [72] | Inventors | John Richard William Heslop;<br>Albert Edward Riley, both of Norton-on-Tees, England |
|---|---|---|
| [21] | Appl. No. | 441,031 |
| [22] | Filed | Mar. 19, 1965 |
| [45] | Patented | Jan. 4, 1972 |
| [73] | Assignee | Imperial Chemical Industries Limited<br>London, England |
| [32] | Priority | Mar. 24, 1964 |
| [33] | | Great Britain |
| [31] | | 12,403/64 |

[54] PLASTIC COATING OF PLASTERBOARDS OR WOOD
1 Claim, 3 Drawing Figs.

[52] U.S. Cl. .................................................. 117/21,
117/65.2, 117/143, 117/148
[51] Int. Cl. ............................................ B44d 1/094,
B44d 1/46
[50] Field of Search ........................................ 117/21,
65.2, 6, 143, 148; 264/337, 338, 316, 213

[56] References Cited
UNITED STATES PATENTS

| 2,513,434 | 7/1950 | Tinsley | 117/21 |
| 2,661,303 | 12/1953 | Fasold et al. | 117/25 X |
| 2,920,698 | 1/1960 | Hornbostel | 117/64 X |
| 2,950,502 | 8/1960 | Weaver | 117/64 X |
| 2,990,278 | 6/1961 | Carlson | 117/17.5 X |
| 3,000,754 | 9/1961 | Zentmyer | 117/21 |
| 3,012,901 | 12/1961 | Reese | 117/21 |
| 3,067,469 | 12/1962 | Yarrison | 117/21 X |
| 3,150,024 | 9/1964 | Penman | 117/21 X |
| 3,170,808 | 2/1965 | Almy et al. | 117/21 X |
| 3,268,351 | 8/1966 | Van Dorn | 117/21 |
| 2,227,494 | 1/1941 | Gold | 117/64 X |
| 2,859,482 | 11/1958 | Warren et al. | 117/65.2 X |
| 3,148,076 | 9/1964 | Snyder | 117/21 |
| 3,157,528 | 11/1964 | Strahl | 117/64 X |
| 3,215,556 | 11/1965 | Kehr | 117/21 X |
| 3,350,483 | 10/1967 | Erb et al. | 117/21 X |

Primary Examiner—William D. Martin
Assistant Examiner—Edward J. Cabic
Attorney—Cushman, Darby & Cushman ABSTRACT: Process for coating the surface of materials such as wood and plasterboard with a thermoplastic material, e.g. polypropylene, by spreading a layer of the thermoplastic material in powdered form over the surface to be coated, subjecting the spread surface to heating by infrared radiation until the thermoplastic material is softened and, before the thermoplastic material has had time to harden, applying pressure to the spread surface so as to cause fusion of the thermoplastic particles, and causing or allowing the resulting thermoplastic coating to set.

PATENTED JAN 4 1972 3,632,372

SHEET 1 OF 2

Inventors
John Richard William Healey
Albert Edward Riley
By
Cushman, Darby & Cushman
Attorneys

PLASTIC COATING OF PLASTERBOARDS OR WOOD

This invention relates to the coating of surfaces with synthetic thermoplastic materials, for example polypropylene, in particular nonatactic polypropylene, polyethylene, nylon. The invention is particularly, though not exclusively, applicable to the coating of wood, for example plywood, cast plaster wall panels and rigid building boards, in particular plasterboard which comprises a plaster-core cast or formed in a paper jacket or former which then becomes an integral part of the plaster core material, imparting to the board desirable bending and tensile properties which it would not otherwise possess. The moisture permeability of the paper jacket or former is very high during manufacture, and it is the object of the invention, after drying the rigid plasterboard, to apply thereto a thin coating of a synthetic thermoplastic material so as to provide it with a desirable waterproof, decorative and/or mechanical surface.

It is not practicable to melt polypropylene and then spray it onto the board in the molten condition, since it tends to degrade at temperatures somewhat above its softening temperature where fusion would be feasible, thereby causing embrittlement and cracking of the coating. Nor is it practicable to spread the thermoplastic material onto plywood or plasterboard and fuse it in situ thereon, for example by means of a direct flame, since plywood and plasterboard will scorch at suitable application temperatures; in the case of plasterboard, furthermore, the water of hydration of the plaster core tends to be expelled at such temperatures, thereby causing blistering of the surface.

These difficulties are overcome, according to the present invention, by distributing a layer of a powdered thermoplastic material over the surface to be coated, subjecting the spread surface to heating by infrared radiation until the thermoplastic material is softened and, before the thermoplastic material has had time to harden, applying pressure to the spread surface so as to cause fusion of the thermoplastic particles, and causing or allowing the resulting thermoplastic coating to set. In order to obtain a sufficiently uniform rolling pressure without damaging the material or article being coated and to ensure that slight irregularities in the surface are followed, it is convenient to apply the said pressure by means of resilient pressure rollers, for example rubber rollers. The plastic coating is preferably caused to set by applying thereto a strippable molding surface such as a cool polytetrafluoroethylene sheet, for example a woven glass fiber sheet impregnated with "FLUON" (registered trademark), which is conveniently interposed between the rollers and the coated surface, and which imparts surface character thereto.

The powdered thermoplastic material is conveniently spread onto a continuously moving surface, under still-air conditions, by a powder hopper or distributor adapted to deposit a substantially uniform layer of powdered thermoplastic material over the whole of the surface. The thermoplastic material is then heated by infrared radiation until it is only sufficiently softened to fuse and flow under the rolling pressure; in the case of polypropylene, this temperature may suitably be between about 240° and 280° C. Thereafter, substantially instantaneous application of pressure to the softened thermoplastic material causes the thermoplastic particles to merge into one another, wetting and penetrating the surface of the material or article and flowing into imperfections therein, thereby producing a smooth and even coating which may be of the order of as little as four- or five-thousandths of an inch in thickness.

The invention also includes apparatus for coating a surface with a synthetic thermoplastic material comprising in combination powder-distributing means adapted to deposit a layer of powdered thermoplastic material over the surface, means for heating the spread surface by infrared radiation, and means for applying pressure to the surface.

Figure 2:
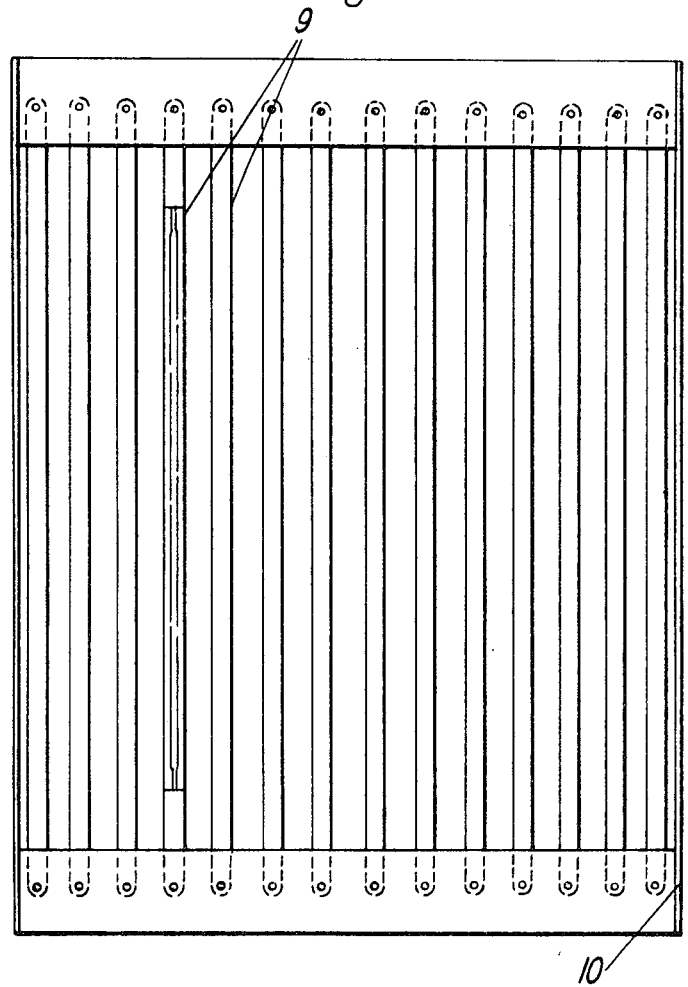
Figure 2A:
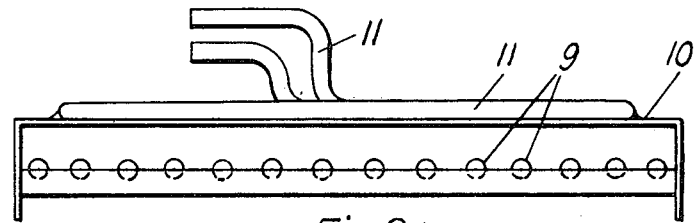

The invention is hereinafter described with reference to the accompanying drawings, wherein:

FIG. 1 is a side view of a powder distribution system suitable for spreading a substantially uniform layer of powdered, thermoplastic material onto continuously moving plasterboard; and FIG. 2 and 2A are, respectively, a plan view and a side view of an infrared heating unit for softening the layer of powdered thermoplastic material.

The powder distribution system illustrated in the FIG. 1 comprises one or more layers of mesh steel gauze 1 sandwiched between a pair of inclined aluminum plates 2 one or both of which are adapted to be vibrated in the direction of the arrow 3. The lower plate 2 is extended beyond the gauze and attached to its lower edge 4 is a channel-shaped hopper 5 of mesh gauze disposed at right angles to the direction of travel of the board 6. Powdered polypropylene is metered into the gauze 1 at 7, from a metering roller, and short-term fluctuations in the rate of powder flow from the metering roller are removed by the vibration of the aluminum plates 2. Below the channel 5, and disposed substantially parallel thereto, is a second channel-shaped hopper 8 of mesh gauze which is adapted to be vibrated transversely, i.e., in a horizontal direction at right angles to the direction of travel of the board 6, in order to reduce any nonuniformity in the flow of powder across the width of the plates 2.

By way of example only, in one particular embodiment, the layers 1 were made of ¼ inch mesh steel gauze and had a combined thickness of ¼ inch; the aluminum plates 2 were each ⅛ inch thick and inclined at an angle of 60° to the horizontal; the channels 5 and 8 were of 1 mm. mesh gauze. Using this arrangement, it proved possible to obtain variations in coating thickness of only ±6 percent in 0.005 inch coatings. An 18 inch wide metering roller was used, the widths of the other parts being selected to give approximately a 3 inch overlap of the powder curtain at the board edges, thereby ensuring that the coating thickness was maintained across the full width of the board.

In order to obtain uniform heating across the board width, and to make the system adaptable for boards of greater width, the heating unit is preferably arranged as illustrated in FIGS. 2 and 2A with a number of infrared lamps 9 spaced at predetermined distances apart to give uniform heating. (Although the lamps 9 are illustrated as parallel to the direction of travel of the board, they may of course be placed at right angles thereto, or at any intermediate angle which provides uniform heating of the surface). In one particular embodiment, fourteen lamps of 1 kw. power were used, spread over a 13 inch width at spacings varying from 1⅛ inch at the center of the board to ⅞ inch at its edges. The lamps 9 are located within a reflector 10 which may be made, for example, of stainless steel or chromium-plated copper sheet. With the high intensity of heating and illumination which this unit provides, it is desirable to provide some form of cooling means for the reflector 10; as illustrated, such cooling means may comprise a coiled copper cooling pipe 11 soldered to the back of the reflector, or the reflector may form the underside of a shallow water jacket. Such a heating unit enables boards to be coated satisfactorily with 0.005 inch polypropylene at speeds of about 15 ft./min. Higher coating speeds could be obtained by using a number of heating units closely spaced along the direction of board travel.

If desired, the powdered thermoplastic material may be preheated (for example by irradiating the underside of the vibrating aluminum plate 2 with one or more infrared lamps) in order to eliminate the presence of occasional partially fused particles in the finished plastic coating.

Although the invention has hereinbefore been described with particular reference to the coating of building boards (e.g., plasterboard) and wood (e.g., plywood) it is equally applicable to surfaces of other materials, e.g., metals such as steel plate and tin plate, glass and ceramics.

What is claimed is:

1. A process for coating a surface of a material selected from plasterboard and wood with a synthetic thermoplastic material selected from the group consisting of nonatactic polypropylene, polyethylene and nylon, comprising distributing a layer of said thermoplastic material in powdered form on to said surface and thereafter subjecting said surface to heating by infrared radiation so that said powdered thermoplastic material is in a heated softened condition on said surface, said thermoplastic material on said surface being heated below the melting point of said thermoplastic material, but being heated sufficiently to soften the same to cause it to flow and fuse into a continuous film under pressure, subjecting the resulting coated surface before said powdered thermoplastic material cools to pressure by passing same between resilient pressure rollers so as to cause fusion of the powdered thermoplastic material into a continuous film and adhesion thereof to said surface, interposing a strippable polytetrafluoroethylene sheet between said coated surface and the pressure rollers simultaneously with the step of subjecting said surface to said pressure so that said strippable sheet is in intimate contact with said coated surface as it passes between said rollers, advancing said strippable sheet while in contact with said surface after passage of the same through said pressure rollers for a time sufficient to set said coating and then removing said strippable sheet from said set coating.

* * * * *